Jan. 20, 1925.
F. X. LAUTERBUR
1,523,883
DOUGH CONDITIONING MACHINE
Filed Dec. 12, 1921   10 Sheets-Sheet 5
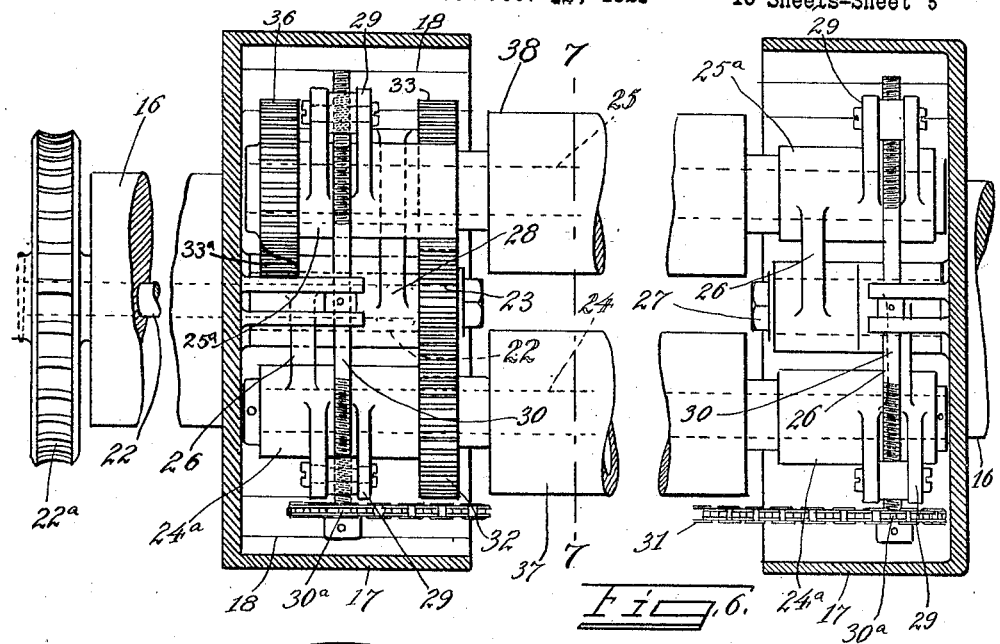
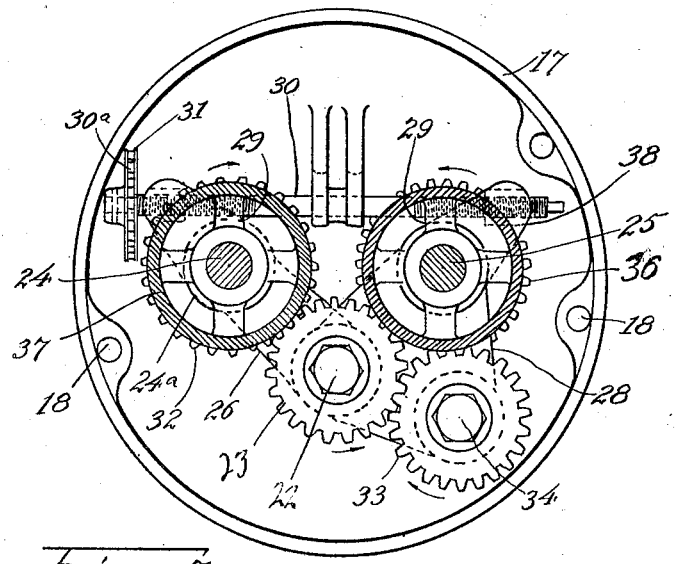
Frank X. Lauterbur
INVENTOR.
BY
Allen & Allen
ATTORNEY.

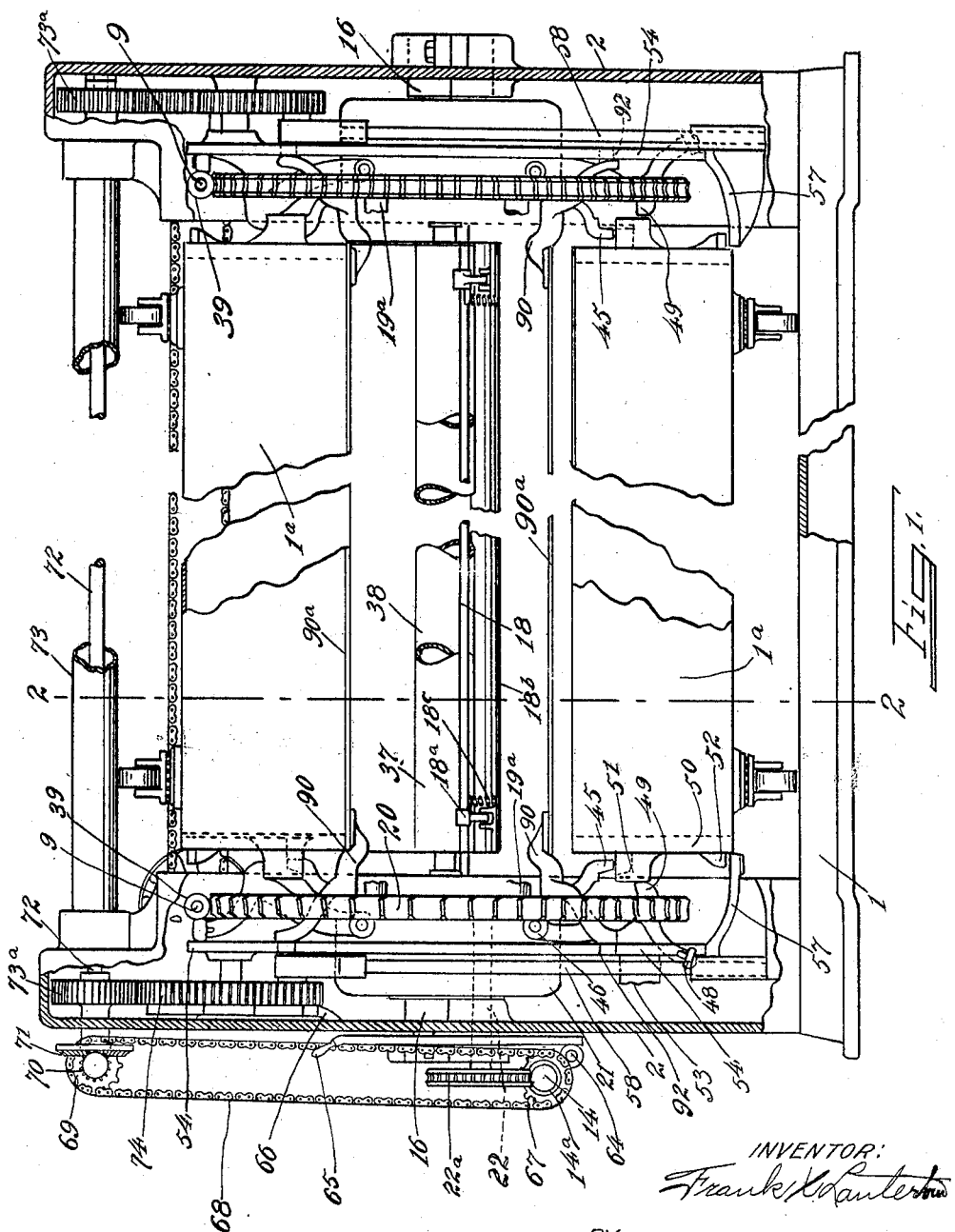

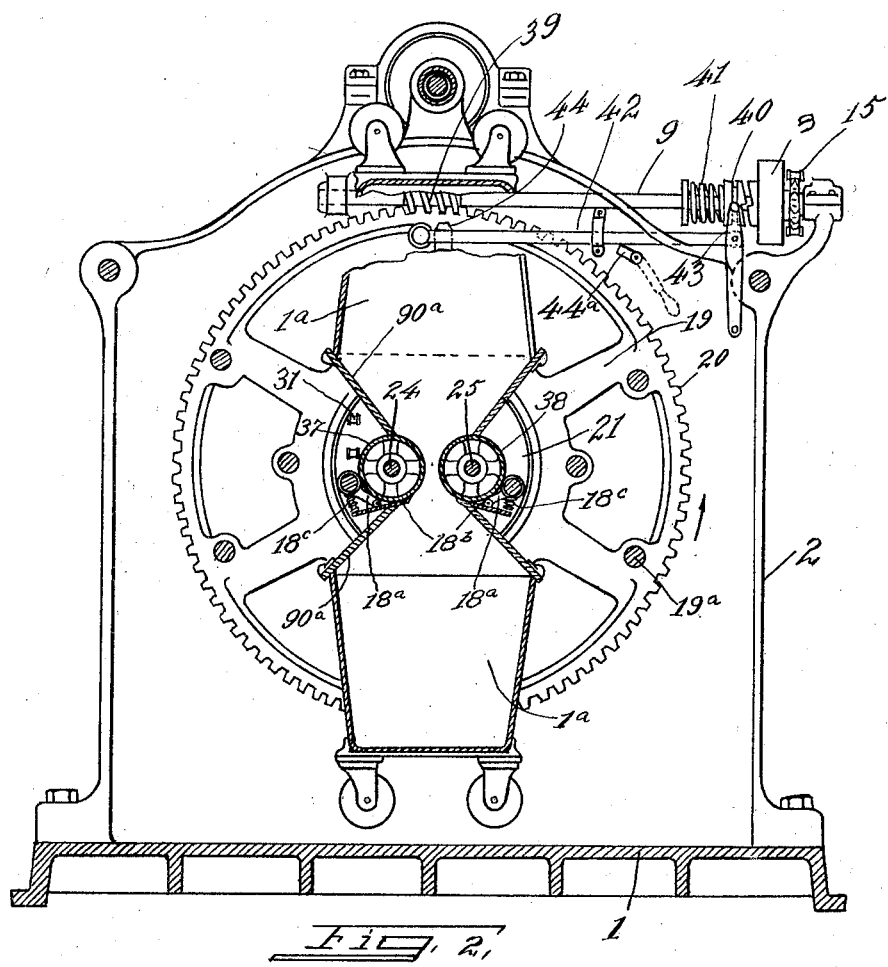

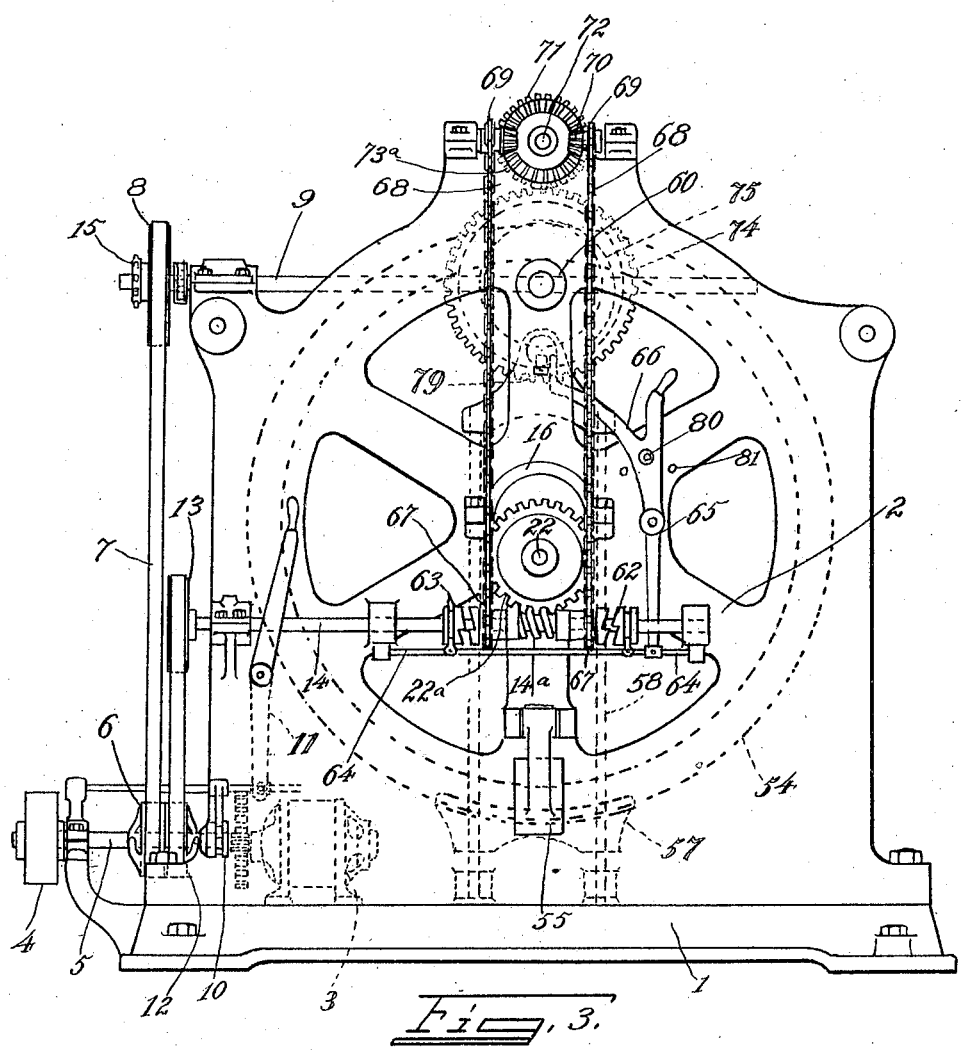

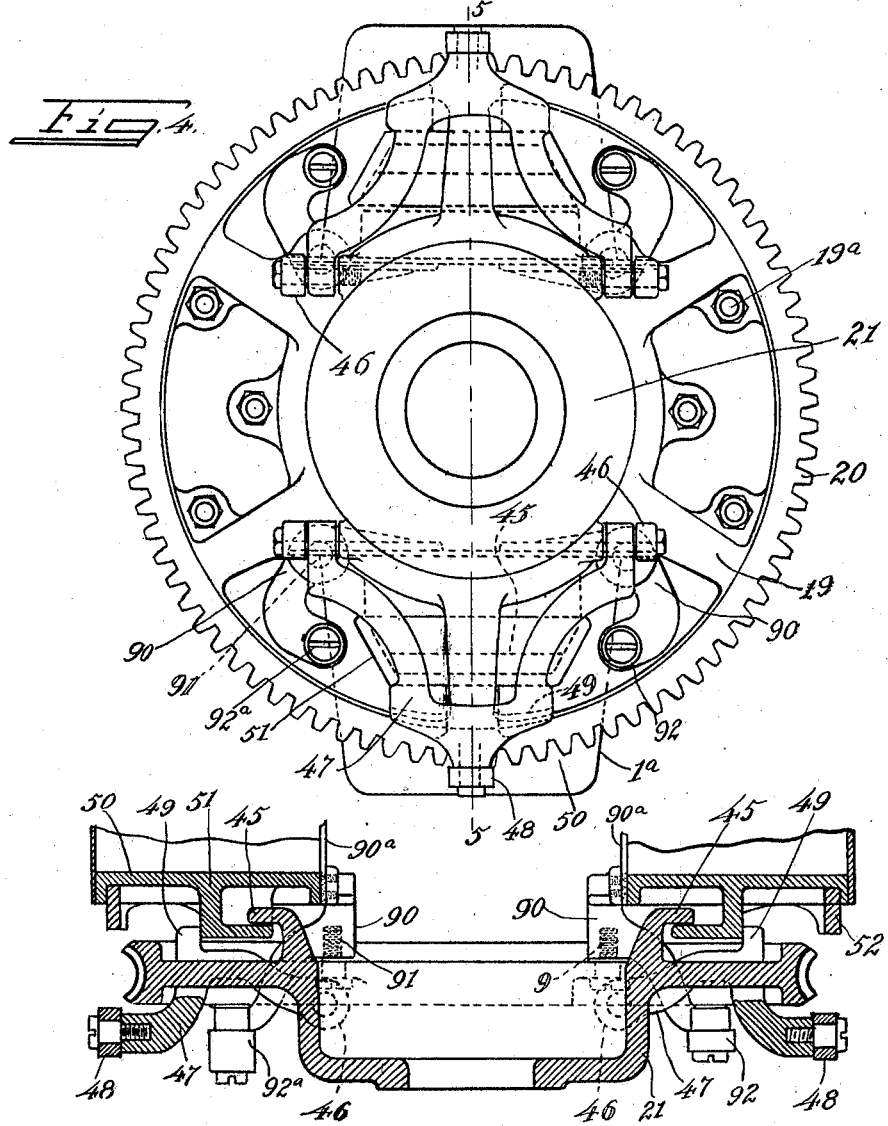

Jan. 20, 1925.　　　　　　　　　　　　　　　　1,523,883
F. X. LAUTERBUR
DOUGH CONDITIONING MACHINE
Filed Dec. 12, 1921　　10 Sheets-Sheet 6
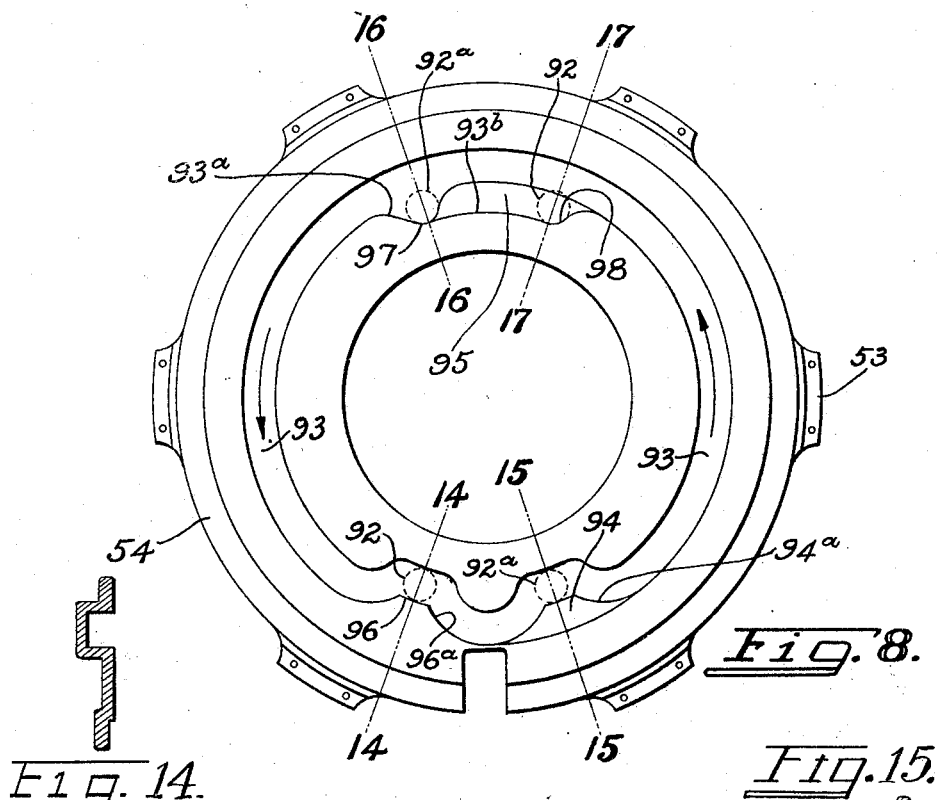
*Fig. 8.*
*Fig. 14.*　　*Fig. 15.*
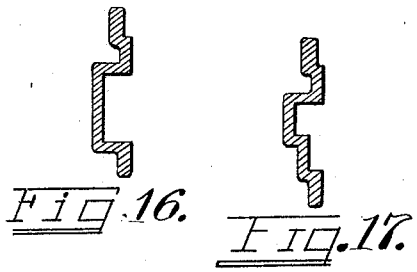
*Fig. 16.*　*Fig. 17.*
INVENTOR:
Frank X. Lauterbur,
BY
ATTORNEYS.

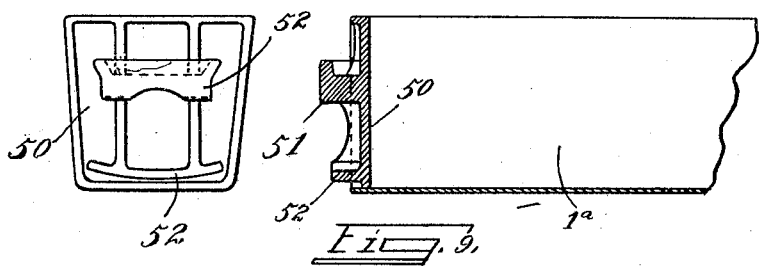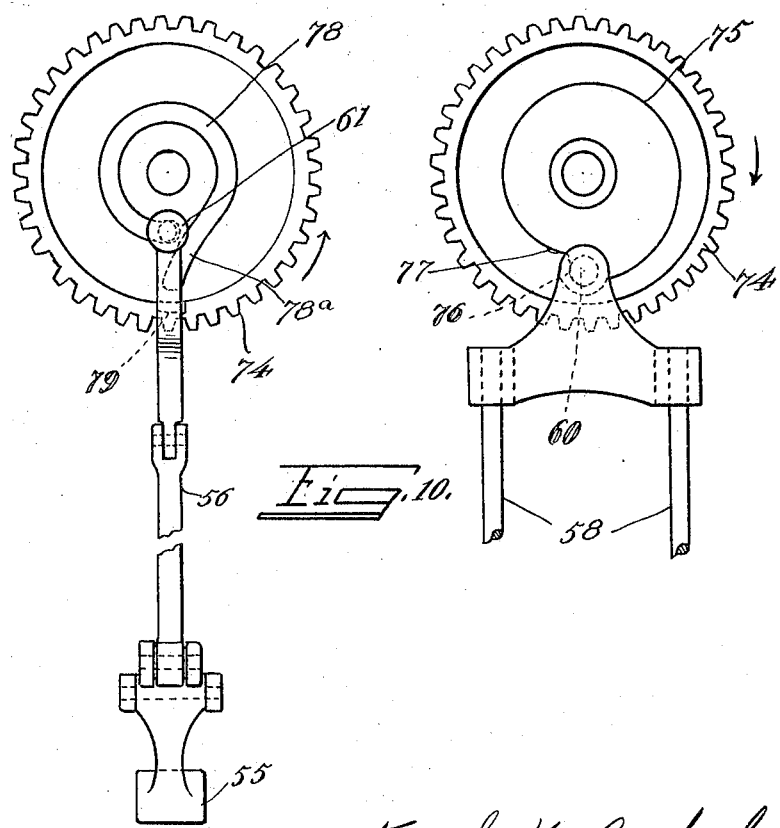

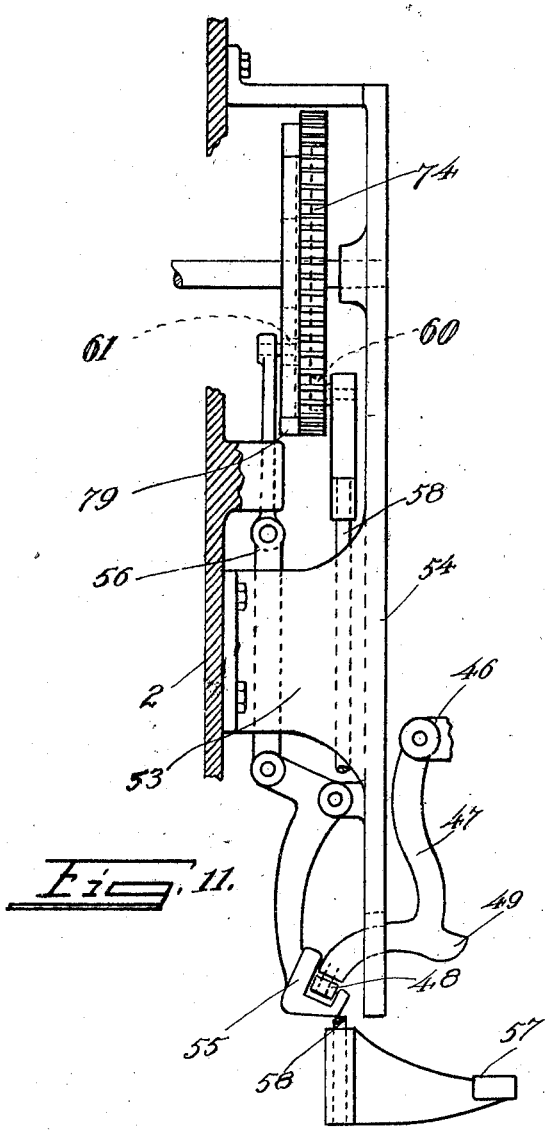

Jan. 20, 1925.  1,523,883

F. X. LAUTERBUR

DOUGH CONDITIONING MACHINE

Filed Dec. 12, 1921  10 Sheets-Sheet 9

Frank X. Lauterbur
INVENTOR.

BY

Allen & Allen
ATTORNEY.

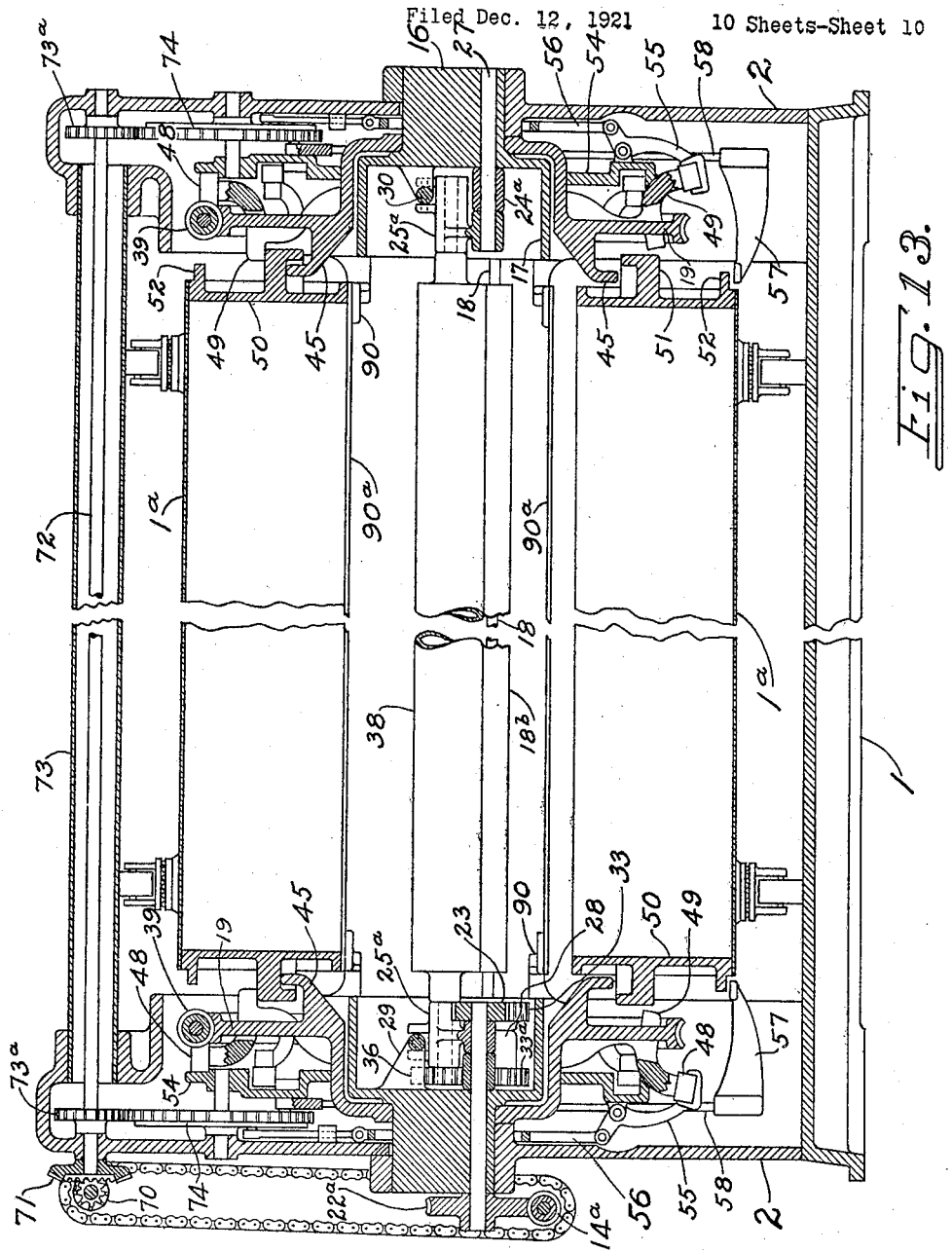

Patented Jan. 20, 1925.

1,523,883

UNITED STATES PATENT OFFICE.

FRANK X. LAUTERBUR, OF SIDNEY, OHIO.

DOUGH-CONDITIONING MACHINE.

Application filed December 12, 1921. Serial No. 521,637.

*To all whom it may concern:*

Be it known that I, FRANK X. LAUTERBUR, a citizen of the United States, and a resident of Sidney, in the county of Shelby and State of Ohio, have invented a certain new and useful Dough-Conditioning Machine, of which the following is a full, clear, and exact description, reference being had to the accompanying drawings, forming part of this specification.

My invention relates to mechanical devices for taking the place of hand manipulation in the conditioning of dough, after it has been mixed, and prior to dividing or "scaling," into shapes for baking.

In the preparation of dough for bread and the like in the bakery following after the mixing operation, the dough is ordinarily placed in a trough where it is permitted to rise and a treatment lasting a number of hours takes place before the dough is ready to be made into loaves for baking.

There are mechanical devices for mixing dough and for forming the loaves of dough in desired shapes without any direct manipulation of the dough by the baker, but the conditioning of the dough prior to using it in the dividing machines has been almost entirely a matter of direct handling.

Depending upon the nature of the dough and the product desired, the treatment will be varied, but taking an ordinary bread dough, it will be placed in the trough after mixing and permitted to rise undisturbed for several hours. The baker then proceeds to work some of the gas out of the dough by a process called "knocking down." Thus he passes along the trough, punching down the dough with his hands and lifting it at one side of the trough and pulling it up over the other, so as to bring the unexposed portions of the dough uppermost, but more particularly to stretch it. He also lifts the mass of dough at its ends in the trough and turns it in over the mass as much as possible, continuing the punching until the dough is in his judgment sufficiently stretched and reduced in gas.

After the first knocking down the dough is permitted to stand for, perhaps, an hour or more and again knocked down in the same manner. The third and usually the last knocking down will usually take place within about a half an hour of the second, after which the dough is ready for use in, say, fifteen minutes.

Some bakers then take the dough and run it through rollers in a "brake" machine in small batches prior to molding into loaves to "young" the dough, this operation taking considerable time because the entire mass of the dough cannot be treated in this way, but only a little at a time.

The present invention introduces into the baking industry an exact science for the conditioning of dough, eliminating a hand operation with its attendant objections and possible unsanitary methods. It does dispense with the only present existing hand operation and certainly the one where mechanical operation should be welcomed in the art.

My dough conditioning machine will preferably be placed in a room or compartment where room-temperature may be controlled as in the usual hand operation, a condition that is essential in the proper treatment of dough. This will warrant a uniformity of dough-rising, and permit the dough to rise in exact times, and hence under perfect control of the operator and the various operative steps may efficiently be made the subject of record. Again, the conditioning rolls may be adjusted to handle dough-batches of any weight, allowing a less or greater space between the rolls as the case may necessitate. Thus, as an example, if an eight-foot trough, holding 1000 pounds of dough requires a roll space of one inch to successfully treat it, the rolls handle a 750 pound batch with equal results by allowing a roll-space of say three quarters of an inch, or such similar differential.

One of the great practical difficulties in the handling of troughs of dough is that they are usually quite heavy, running in weight, in the usual bakery, to a thousand pounds and upward. Another difficulty is that to attempt to discharge dough out of a trough and back again would be disastrous without special mechanical expedients, since the troughs are simply open, narrow boxes and would not hold back the dough sufficiently to permit dumping.

The dough when ready for conditioning is in a very unwieldy condition and does not flow naturally as does a dough in the little dough brakes of the prior art.

It is the object of my invention to provide a machine which supplies rolls of a length approximately that of a trough and to dump the troughs, bottom up, into the space between the rolls, so that the dough is freed from the desired amount of gas, given the proper stretch, and turned upside down, after which it is delivered into another trough.

Another object of my invention is to provide a machine which will lift up a trough of dough and invert it without spilling the contents, and then will eject the dough from the trough along the entire length of the trough in such a way and to accurately direct it to the space between the conditioning rolls aforesaid.

It is my object to provide safeguards in machines of the above noted character, which prevent the improper handling or dumping of troughs, and also to provide for adjustments of the conditioning rolls.

I am not aware of any attempt, practical or otherwise, in the prior art to take the place of the "knocking down" operation, and any other operations for treatment of dough, while it is rising, in a mechanical manner, preserving the dough free of contact with the baker's hands, and making the operations capable of pre-calculation and considerable accuracy.

These objects and other advantages to be noted I accomplish by that certain construction and arrangement of parts to be hereinafter more specifically pointed out and claimed.

In the drawings,

Figure 1 is a front elevation of the machine.

Figure 2 is a section taken on the line 2—2 of Figure 1, showing the trough elevated.

Figure 3 is an end elevation of the machine.

Figure 4 is a detail elevation of the bull gear and attached parts.

Figure 5 is a section on the line 5—5 of Figure 4.

Figure 6 is a detail elevation of the conditioning rolls and operating parts, showing the gear case devices in section.

Figure 7 is a section on the line 7—7 of Figure 6.

Figure 8 is a plan view of one of the cam and track plates.

Figure 9 is a detail cross section taken through one of the troughs, showing the special ends used in the particular embodiment of the invention shown in the other views.

Figure 10 is a front and rear elevational view of the gear-cam member with portions of the mechanism controlled thereby.

Figure 11 is a side elevation of the trough latch controlling parts.

Figure 13 is a central vertical cross section taken at right angles to Fig. 2.

Figure 14 is a fragmental cross section taken at 14, 14, Fig. 8, showing the roller on a full depth crest.

Figure 15 is a fragmental cross section taken at 15—15, Fig. 8, showing the roller on a half depth rib.

Figure 16 is a fragmental cross section taken at 16—16, Fig. 8, showing the roller lying in a full depth notch.

Figure 17 is a fragmental cross section taken at 17—17, Fig. 8, showing the roller in a half depth notch.

Figure 12:
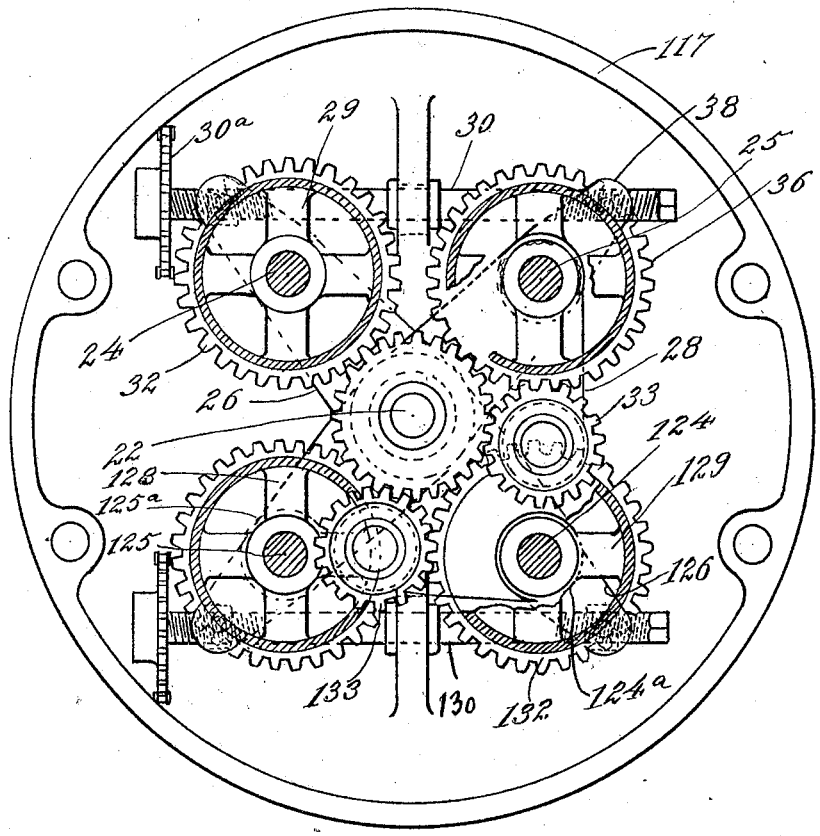
Figure 12 is a like view to Figure 7, showing an additional pair of rolls for conditioning.

The machine shown in the drawings is but one embodiment of a structure which will accomplish the purposes of my invention, but I show it in considerable detail in order to describe one means whereby those skilled in the art may avail themselves of the advantages of the invention.

Thus there is a base 1, upon which bakers' trough 1$^a$ of usual size may be rolled, from which extend upwardly the side standards 2. The drive may be either from a motor 3 or from a pulley 4 to the driving shaft 5. On this shaft 5 is a pulley 6 from which a belt 7 runs to an idle pulley 8 on the overhead worm shaft 9. Also on this shaft 5 is a clutch 10, operated by a lever 11, said clutch serving to couple a pulley 12 to the shaft, same being otherwise loose thereon.

From the pulley 12 a belt runs to the pulley 13 on the shaft 14. The shaft 9 is duplicated, and a chain and sprocket device 15 connects the two shafts 9, said shafts serving to drive the two bull gears.

The shaft 14 is mounted on the outside of the side frame and the shafts 9 are mounted to come directly over the bull gears (to be described below).

The frame is tied together by tie rods in any desired way, no attempt being made to show in great detail the purley frame parts of the mechanism.

Mounted firmly in the sides of the frame are cylindrical casings 16, which extend inwardly of the frame and mount at their inner ends, or are formed as part of boxes 17, said boxes being tied together by rods 18 across the frame and serving to house the conditioning roll, gears and bearings.

The bull gears 19, having teeth 20 and connected by tie rods 19ª, are formed with dome-shaped bodies 21 to fit over the boxes 17, and said dome-shaped portions are journaled on the cylindrical casings 16.

Thus the bull gears may revolve while the boxes 17 remain stationary, and the boxes 17 will terminate on their inner ends about flush with the inner faces of the gears, whereby the conditioning rolls may extend across between the boxes and may have a length as great or greater than a trough held between and inverted by the movement of the bull gears.

The conditioning rolls.

In the casing 16 at one side of the machine is a shaft 22, which extends through into the box at this point and is provided with a pinion 23. There are two roll shafts 24, 25, mounted in journals 24ª and 25ª in each box. (Figures 6 and 7.) The journals in the right-hand box are formed with arms 26, 26, pivoted on a pin 27, which takes the place of the shaft 22 in the left-hand box.

In the left-hand box, which is the only one that has gears in it, there is one arm 26 corresponding to the arms 26 above mentioned, and the other arm is in the form of a triangular plate 28.

The reason for the triangle is that this arm also carries pinions 33 and 33ª, mounted on a shaft 34, as will be described later.

On each journal is a trunnion 29, the trunnions being right and left-hand threaded, and a right and left-hand screw 30 is set between each pair, so that the revolution of the screws will adjust the relative positions of the shafts 24 and 25. As a simple way of operating both screws at once I mount on the end of each screw a sprocket wheel 30ª, said wheels being connected by a chain 31, which will be manipulated to adjust the screws.

In the box containing the gears, the one shaft 24 carries directly on it a gear 32, which meshes with the pinion 23 and moves in a planetary path around it during adjustment. On the triangular plate there is a loose pinion 33 meshing with the pinion 23 and also planetary with relation thereto.

The pinion 33 is on a shaft 34, which is journaled in the triangular plate 28, and said pinion 33 meshes with pinion 23 on shaft 22, at the other end of the shaft 34 is another pinion 33ª that meshes with the gear 36 on the end of the roll shaft 25. The triangular plate also carries a journal for the shaft 35. The extra pinion 33ª is below the gear 36 in the view shown in Figure 6. The purpose of setting the gears 36 and 32 out of the same vertical plane is to permit of the use of large gears, and still provide for a possible close adjusted relation of the conditioning rolls.

The conditioning rolls, as shown at 37, 38, are mounted fast on the shafts 24 and 25, and by the mechanism described are driven in opposite directions with their paths both being downward toward the space between them.

The drive for the shaft 22 is from a worm 14ª on the shaft 14 meshing with a worm wheel 22ª on the said shaft 22. On two of the tie rods 18 between the boxes 17 are interspaced arms carrying scraper plates 18ᵇ for the two rolls. Springs on the plates, as at 18ᶜ, bear on the tie rods and hold the scrapers in position.

The bull gear operation.

Referring next to the drive of the bull gears, and the function thereof, it will be noted that the pulley 8 is loosely mounted on the one shaft 9, and coupled and uncoupled therefrom by a spring clutch device 40, and that the sprocket 15 is fast on the one shaft 9 and not connected to the pulley, so that the clutch controls the operation of both shafts 9. The bull gears are driven by worms 39 on the shafts 9.

This clutch is held in mesh by a spring 41 and pulled out of mesh by a rod 42 connected to a forked lever 43 on the frame. On the adjacent bull gear there are lugs 44 which contact with the end of the rod 42 and push the clutch out of mesh. The trip rod 44ª extending to a convenient position for operation, acts to move the rod 42 through a small arc sufficient to free the end of the rod from the tip of the lug, so that the clutch can spring into engagement. The rod will have sufficient free movement in its mounting brackets to give this free play, and the spring on the clutch will naturally pull it into position to be engaged by the next lug on the bull gear. In the mechanism shown there are two lugs on the bull gear adapted to permit a 180 degree operation thereof upon each tripping of the clutch rod.

Each bull gear has at 180 degrees apart webs 45, which extend inwardly of the gears near the center and then outwardly. Each gear has thereon a pair of trunnions 46 located on their outer faces, said trunnions supporting swinging frames 47, each of which has a roller 48 on its end. The frames are roughly triangular in shape and each has a web 49 thereon which will pass between the spokes of the bull gear and come into a position extending inwardly of the machine, outside of the webs 45.

Referring next to the dough troughs it will be noted (Figure 9) that they have special ends 50, which have central webs 51 that extend out from the trough ends and thence upwardly toward the open tops of the troughs to form a pocket. The ends have also near the base of the trough, webs 52, which extend out straight from the ends and are formed in the shape of an arc, drawn on the center of the bull gears, considering the troughs in engaged position.

It will be noted, as the description proceeds, that the fixed webs 45 on the bull wheels are in position so that when the troughs are lifted up, they will engage in the pockets of the webs 51 on the trough ends, and the webs 49 on the frames 47 will engage the said webs 51 on their edge opposite to the engagement of the webs 45.

*Trough elevating and holding devices.*

To lift the troughs a shoe is provided which is elevated by power to engage under the webs 52 on the troughs and so lift them up until the webs on the swinging frames can ride into the engaging position above mentioned. In the view shown in Figure 1 the troughs are in engagement at the top of the view and out of engagement at the bottom.

Mounted at the sides of the frame by means of long lugs 53 are annular plates 54 (Figures 8 and 11), which on their outer periphery provide a track for the rollers 48 on the swinging frames 47. During the movement of the bull gears the said plates are so located that they force the rollers into a position for the web on the swinging frames to engage the trough webs. At the bottom of these plates, however, there is a hinged flap 55, which, in one position, lies flush with the face of the respective plate, but which is swung outwardly by a toggle 56 connected to the flap, thereby permitting the rollers to move to a position to disengage the webs above referred to. The flaps are formed in a U-shape so that when the rollers come into a position with the bull gears stopped, they will lie inside of the U (Figure 11) and be positively pulled outwardly when the flap is swung, and be positively swung inwardly when the flap is moved in.

The shoes 57 which elevate the troughs primarily, are mounted on twin rods 58, which are journalled to slide in the machine so that the shoes will come under the lower webs on the troughs to raise them.

The frames have at their upper ends, anti-friction rollers 60, and the toggles 56, above referred to, have at their upper ends the anti-friction rollers 61. The same devices operate both rollers to raise the troughs and control the latching webs 49, in a safe and fool-proof manner.

Referring back to the introductory description, it will be remembered that the shaft 14 was employed to revolve the conditioning rolls. On this shaft are a pair of clutches 62 (Figure 3), one working to the right and one to the left, same being controlled from the sliding rod 64. To slide the rod 64 I employ a lever 65, which has a suitable handle and also a safety arm 66 for automatic regulation.

The operation of the clutch sets into motion one or the other of a pair of sprockets 67, both of which are connected by chains 68 with a pair of sprockets 69 at the top of the machine.

Each of the upper sprockets has a beveled gear 70 meshing with a larger beveled gear 71 on the top shaft 72. This shaft extends across the machine within a tube 73, which is used as a tie rod.

Adjacent each slide of the machine, the shaft is equipped with a gear 73$^a$ (Figure 1), which meshes with another larger gear 74, said last mentioned gears having cams on both faces thereof (Figure 10).

On the inner face of the gears 74 is a cam rib 75, which has one deep depression 76 and close to it a shallow depression 77, said rib being otherwise roughly a spiral in contour. The rollers 60 on the elevating shoe rod device ride in this groove.

On the other side of the cam gears (the outer side), there is a cam groove 78, in which rides the roller 61 on the flap to toggle 56, said cam groove having a circular shape except for one deep pocket 78$^a$.

Taking up the operation of these parts for the lifting and moving of the troughs, it will be noted that the troughs are moved into the machine laterally on their usual rollers, and the clutch lever moved to couple the right hand clutch. This will cause the gear cams to revolve in the direction shown in Figure 10 by the arrows. The roller 60 will be elevated slowly by the rib 75 until the shallow notch has nearly been reached and during this time the flap on the annular plates 54 will remain closed.

There is a lug of a width sufficient to prevent a complete revolution of the gear cams in either direction mounted at the periphery of each gear device, and extending into a position to engage the safety arm 66. This lug is shown at 79 and it will be noted that by the time the parts have come to a position with the flap still closed and the roller 60 about to drop into its shallow pocket, this lug will contact with the safety arm and move the clutch rod to a neutral position. If desired, a spring plunger 80 on the clutch lever can be used to insure the lever moving only to neutral, this plunger springing into holes in the supporting frame, as indicated at 81.

Just before the time the roller 60 has dropped into the shallow notch, the roller 61 will have moved to the position in the pocket 78$^a$, so that just after the flap is fully closed the lifting device for the trough will give way a little, and the entire mechanism will come to a stop.

The toggle operation is a flexing outwardly which will shift the flap in a way which will be readily understood, the outward flexing taking place as the roller 61 moves into the cam portion 78ª.

The point in having the roller 60 drop into the shallow groove is to permit the shoe 57 to lower a little, after the trough is lifted and locked, so that when the bull gears start to move, the shoes will not be bearing the weight of the trough.

When the bull gears have moved through a half revolution and stopped, the operator may desire to remove a trough of conditioned dough, whereupon he will have to move the clutch lever in the opposite direction to the one above described, since the lug 79 is in the way of connecting up the right-hand clutch. The left-hand clutch will then reverse the operations above described, with the result of the parts coming into the position shown in Figure 10.

The reverse operation is used to deposit a trough at the bottom of the machine. The trough at the top of the machine is always held fast.

Trough closing devices.

Referring finally to the devices for closing the troughs and maintaining them closed until it is desired to dump the contents. The primary features of my machine in this regard are that the trough closures are part of the machine and automatically operated and that they form a funnel-like opening for the troughs, so that in dumping they will direct the dough between the conditioning rolls through a somewhat constricted opening, whereby the upper dough, which has been on the trough while rising is taking place, will be sent first through the rolls and go to the bottom of the receiving trough.

There are two sets of closing flaps 90ª, one for the bottom and one for the top of the machine while stationary.

The flaps are mounted on arms 90 (Figures 4 and 5), of which there are two for each flap. The arms are pivoted to bolts 91 on the inner faces of the bull gears and have rollers 92 and 92ª thereon, 92 being a short roller and 92ª being a long roller (see Fig. 5), which extend through the spokes of the gears 20 to be engaged by cam devices.

On the main bodies of the arms 90 the closing lids or flaps 90ª are mounted and so arranged that when the arms are swung toward the center of the bull gears the flaps will shut down over the troughs, but when swung outwardly the flaps will rest against the peripheries of the conditioning rolls or closely adjacent thereto.

The annular plates 54 (Figure 8) have formed on their inner faces a cam groove 93 having two depths. Thus at the point 94 there is a rib formed in the groove partway of its depth, and also at the po'nt 95. Taking the pairs of arms for one set of flaps, it will be noted that the rollers 92 and 92ª thereof will be spaced apart in such a way that they will lie at the bottom of the machine on the full depth crests 96 and the half depth ribs 94 (see Fig. 8). This position of the rollers will result in holding the flaps in open position. At the same time the rollers on the upper flap arms are lying in the notch 97 beyond the half depth rib 95, and in the half depth notch 98. This will result in a swinging of the arms to open the flaps into the pos'tion shown in Figure 2.

The use of rollers 92 and 92ª of different lengths for the flap arms 90 result in a simultaneous opening of the flaps 90ª for the top of the machine, and a simultaneous closing of the flaps for the bottom of the machine, when the bull gears 20 come to a point of rest by lug 44 operating to throw out the spring clutch device 40. This takes place every 180 degrees of the rotation of sa'd bull gears. Referring to Figure 8 and Figs. 14, 15, 16, and 17, the cam groove 93, mainly circular, but with the irregular surfaces 94, 96, 97, and 98, is provided with a rib 94, of a similar contour to the full depth crest 96, but of a half depth, that is, if the cam groove 93 be one inch deep below the annular place 54, the rib 94 will be only one half inch deep. Similarly, there is an upper rib 95 of a half depth. Now, referring to Fig. 8, it will be noticed circles representing the rollers 92 and 92ª, and arrows denoting the rotary movement of the mechanism carrying said rollers. Taking the top of the machine first, the long roller 92ª is in advance of short roller 92, and reaching down the full depth of the groove 93 will ride over the half depth rib 95 until it comes to the notch 97. Simultaneously with roller 92ª reaching the notch 97 the roller 92 reaches the half depth notch 98 and hence both rollers 92 and 92ª drop simultaneously as also the coact'ng arms 90 and the flaps 90A; and in this position the bull gear 20 instantly stops on account of lug 44 disengaging the drive means by releasing the spring clutch device 40. While the upper sets of flaps 90ª are being opened downwardly (as shown in Fig. 2) the lower set of flaps are be'ng opened upwardly, but, as shown in the drawings, the action is not quite the reverse, although the means I herewith illustrated may be subject to other modifications within the spirit of my invention. The long roller 92ª is in advance of the short roller 92, and, in passing over crest 96 will open the one flap 90ª and then close said flap as roller 92ª drops back into path of main cam groove 93, and with further travel of the roller 92ª it will ride up the half depth rib 94 and again open flap 90ª simultaneously with the short roller 92 rd-ing up crest 96, and hence both flaps will open upwardly as shown in Fig. 2. In this position the machine comes to a stop, and both upper and lower sets of flaps are open, as shown in Fig. 2, and this operation is repeated with every 180 degrees rotation of the bull wheel 20.

Now the flaps 90ª are closed in a similar manner to that of opening them. As the upper set of rollers 92 and 92ª move forward the long roller 92ª will leave the notch 97 and ride up to the cam sprface 93ª and close the coacting flap, while the short roller 92 will travel along the cam surface 93ᵇ and will not close its mating flap until it reaches the top of the inclined cam surface 93ª; thus the following flap 90ª will not close as soon as the leading flap. However, both flaps may be closed simultaneously if so desired by adding additional mechanism to produce this result, but in the embodiment as shown I prefer to use the simplest construction, since it is not essential that the upper set of flaps close against the trough 1ª simultaneously on account of said trough being empty. The lower set of flaps will close simultaneously because both rollers 92 and 92ª are riding on cam surfaces 94 and 96 of similar contour. This is the preferable operation since the trough has a batch of dough in the lower position. As the long roller 92ª (which is riding on the half depth rib 94) advances it falls down the inclined cam surface 94ª and hence closes its mat'ng flap, and simultaneous with this movement is the action of roller 92 falling down the inclined cam surface 96ª. Now roller 92 (being a short roller), as the movement progresses, will not ride up the half depth rib 94, but will pass alongside the said rib, and hence the roller 92, arm 90 and coact'ng flap 90ª will not be effected thereby. Similarly, special construction of the half depth rib 94 could be employed whereby the leading flap 90ª would be opened ahead of the following flap, a distance of travel equal to the distance the rollers 92 and 92ª are spaced apart, for the crest 96 will open both said rollers. It is not necessary that both bottom flaps open upwardly simultaneously since the trough is empty in this position, and the length of the arms 90 are so constructed that as the one flap 90ª opens before the machine has made the full 180 degree movement, the clearance is sufficient that the flap will not interfere with the scraper plates 18ᵇ.

*Operation of the machine.*

Although some description of operation has attended the detailed description above, it is desired to call attention to the mode of use of the machine in the bakery. In a bakery of fairly good sized production there will be about six batches, on the average, of dough in the process of conditioning. Thus the baker will have six troughs full or partially full of dough, which is rising, each batch having to be treated from time to time.

The baker having one of the above machines will carry one extra trough in the machine, which at the start he will turn uppermost. He will then roll under the machine a trough as in Figure 1 and operate the lever which throws the clutch for elevating the trough into the position in Figure 2. The resultant operation, it will be remembered, is to bring the trough into engagement with the fixed and the swinging webs on the bull gears, and also to slightly lower the lifting shoes so that when the bull gears start the troughs will not be resting on the lifting shoes.

The operator then operates the trip on the bull gear clutch device permitting it to snap into mesh, and the bull gears will slowly revolve. As soon as the revolution commences the flap lids for the lower trough will close together accurately over the top of the trough, which is accurately positioned with relation to the gears. Before the trough is tipped, the lids will prevent the dough from spilling, and by the time the trough is entirely inverted and the bull gears come to their automatic stop, the dough will be inverted along with the trough.

The instant of the trough coming to uppermost position will be accompanied by the opening of the lids of the trough, and just before this the lids of the empty trough, which was uppermost when the machine started, will have come to the lowermost position with its lids open.

The operator will have previously started up the conditioning rolls, so that they will revolve to feed the dough downward from the hopper formed by the lids of the uppermost trough into the lowermost trough. The roll action will both squeeze the dough and elongate it as it pulls it out of the hopper, and since the dough has been inverted, the mass deposited in the lower trough will be inverted over its position before the operation began.

The operator will then operate the lifting device in a reverse direction, which will first disengage the swinging frame latch on the bull wheel and then gradually lower the trough until it rests on the base of the machine, ready for removal.

The empty trough above will be permitted to remain in place, and the operator can roll in another full trough that is to be treated.

Since the whole treatment is short as compared to the usual knocking down process, there will be great economy in labor cost, as well as in efficiency and cleanliness, because one machine can do all the knocking down for as many troughs as desired. Uniformity of treatment hitherto impossible to secure may and will be accomplished by this machine, vastly improving the average quality of the baker's products. Also exact times for said treatments can be more uniformly followed since the operation is a mechanical one; and these features produce a dough of exact uniformity.

As a final operation of the dough, the rolls may be adjusted very close together, and a "younging" operation given to it as in the "brake" machines on the market today.

In larger machines, using troughs of greater size and having room for additional rolls in the central portion thereof, I may provide for the arrangement shown in Figure 12. Thus the boxes 17 are merely enlarged in size to make boxes 117 and another set of rolls used, which are set up and mounted exactly as if the showing in Figure 7 were swung around on the shaft 22 to make up the lower rolls.

Thus in addition to the parts shown and numbered in Figure 7 there will be shafts 124 and 125 corresponding to the shafts 24 and 25. There will be journals 124ª and 125ª. The arms 126 and the triangular plate 128 will correspond to the parts 26 and 28, as will the trunnions 129 and screws 130 correspond to the parts 29 and 30.

The pinions and gears will be located in the same way, except for the inversion, as the pinions and gears in Figure 7. The teeth will be less, however, on the gear 132 than on the corresponding gear 32, and on the pinion 133 as compared to the corresponding pinion 33.

The result of this modification is that the dough as it passes through the two sets of rolls is pulled by the lowered set more rapidly than delivered by the upper set, and, therefore, is stretched or attenuated in body by the resultant action.

In the preliminary knocking down, the lower set of rolls may be spaced so widely that they do not interfere with the passage of the dough to the lower trough. The lids for the troughs will bear on or lie adjacent to the upper set of rolls and the lower set of rolls in this modification.

I wish it distinctly understood that the details of construction set forth above are not to be construed as limitations in the scope of my invention which I conceive to be broadly the idea of mechanically conditioning a batch of dough from a trough by means of rolls into which the trough is laterally dumped.

Having thus described my invention, what I claim as new and desire to secure by Letters Patent, is:—

1. In a machine for conditioning dough, the combination with a trough adapted to hold a mass of conditioning dough of driven rotary members, and means for demountably engaging and dumping the trough of dough laterally between said rotary members.

2. In a machine for conditioning dough, the combination with a trough adapted to hold the mass of conditioning dough of driven rotary members, said members having a length approximately the same as the trough of dough, and means for demountably engaging and dumping the trough of dough between said rotary members.

3. In a machine for conditioning dough, the combination with a trough adapted to hold the mass of conditioning dough of a plurality of pairs of rolls or the like, means for driving them, and means for demountably engaging and dumping the trough of dough laterally between them, whereby the dough passes between each pair.

4. In a machine for conditioning dough, the combination with a trough adapted to hold the mass of conditioning dough of a plurality of pairs of rolls or the like, means for driving them, and means for demountably engaging and dumping the trough of dough laterally between them, whereby the dough passes between each pair, said lower rolls being adapted for higher peripheral speed.

5. In a machine for conditioning dough, the combination with a trough adapted to hold the mass of conditioning dough of driven rolls, of means for demountably engaging and dumping the trough of dough laterally between said rolls, and means for adjusting the relative lateral spacing of said rolls.

6. In a machine for conditioning dough, the combination with a trough adapted to hold a mass of conditioning dough with a conditioning element, of means for demountably engaging the trough of dough and inverting it into the conditioning element.

7. In a machine for conditioning dough, the combination with a conditioning element, of means for demountably engaging a trough of dough, means for closing the top thereof so as to prevent loss of the dough, means for inverting the trough and then opening the top thereof to dump the dough laterally into the conditioning element.

8. A method of conditioning dough from a trough adapted to hold the dough batch while raising, which consists in passing the entire mass of dough laterally of its length through revolving rolls or the like and into another trough.

9. A method of conditioning dough from a trough adapted to hold the dough batch while raising, which consists in passing the entire mass of dough laterally of its length through revolving rolls or the like.

10. A method of conditioning dough from a trough adapted to hold the dough batch while raising, which consists in inverting the entire mass of dough and passing it laterally of its length between revolving rolls or the like.

11. In a machine for conditioning dough, the combination with a trough adapted to hold the mass of conditioning dough of driven rotary members, of means for ejecting a mass of dough from the trough with the top surface of the dough lowermost into the space between said rotary members.

12. In a machine for conditioning dough, the combination with a trough adapted to hold the mass of conditioning dough of driven rolls, means for adjusting the lateral spacing between them, and means for demountably engaging and elevating and laterally dumping the trough of dough between said rolls.

13. In a machine of the character described, the combination of rotating rolls, a trough engaging device, a trough lifting device, a trough inverting device, a cover device for the trough to close it while being inverted, said devices being operable to lift and invert a trough of dough over the rolls, and then remove the cover to dump the contents bottom up between the rolls and finally to disengage the trough.

14. In a device of the character described, the combination with a trough adapted to hold a mass of conditioning dough of rolls located adjacent to each other to engage and thin a mass of dough introduced from above, and mechanism revoluble about said rolls and adapted to demountably engage and elevate a trough of dough over the rolls and demountably retain an empty trough beneath the rolls.

15. In a device of the character described, the combination with a trough adapted to hold a mass of conditioning dough of a pair of revolving elements, trough clamping devices thereon, to demountably engage a trough, a set of rolls mounted axially of said revolving elements, and means for driving the rolls and the revolving elements.

16. In a device of the character described, the combination with a pair of revolving elements, trough clamping devices thereon to demountably engage a trough, a set of rolls mounted axially of said revolving elements, and means for driving the rolls and the revolving elements, and trough closing means mounted on the revolving elements, and means for opening and closing said closing means.

17. In a device of the character described, the combination with a pair of revolving elements, trough clamping devices thereon to demountably engage a trough, a set of rolls mounted axially of said revolving elements, and means for driving the rolls and the revolving elements, and trough closing means mounted on the revolving elements, and means for opening and closing said closing means, automatically upon desired positions of the revolving elements.

18. In a device of the character described, the combination with a pair of revolving elements, trough clamping devices thereon, a set of rolls mounted axially of said revolving elements, and means for driving the rolls and the revolving elements, and an independent elevating device adapted to lift a trough into engagement with the said trough clamping devices.

19. In combination with means for lifting and inverting a trough of dough, an element on said means for engaging a trough and holding it, and a lifting and lowering device to place a trough into engagement and let it down from engagement with the said element.

20. In combination with means for lifting and inverting a trough of dough, an element on said means for engaging a trough and holding it, and a lifting and lowering device to place a trough into engagement and let it down from engagement with the said element, said device being operable only alternately to lift a trough in one movement and lower it in the next.

21. In combination with rotating means for lifting and inverting a trough of dough, a clamping device for engaging and holding the trough on said rotating means, and an elevating and lowering device co-operating with the clamping device to alternately lift a trough into engagement therewith, and release the clamping device and lower the trough.

22. In combination with means for lifting and inverting a trough of dough, an element on said means for engaging a trough and holding it, and a lifting and lowering device to place a trough into engagement and let it down from engagement with the said element, said device also adapted to control the said element to the extent of releasing it at a given position of the lifting device.

23. In combination with rotating means for lifting and inverting a trough of dough, a clamping device for engaging and holding the trough on said rotating means, and an elevating and lowering device co-operating with the clamping device to alternately lift a trough into engagement therewith, and release the clamping device and lower the trough, said releasing of the clamping mechanism being mechanically limited to take place at one position only of the rotating means.

24. In combination with means for lifting and inverting a trough of dough, an element on said means for engaging a trough and holding it, and a lifting and lowering device to place a trough into engagement and let it down from engagement with the said element, said device having a limited operation controlled mechanically to alternately lift a trough to a given position and then stop and at the next energization to lower a trough from said position and stop.

25. In combination with rotary means for lifting and inverting a trough of dough, a fixed engaging member on the rotating means, and a movable engaging member on the said means, said two members being adapted to engage and hold a trough of dough between them, a fixed abutment to hold the movable member in engaging position, a release operating in connection with the fixed abutment at a selected point thereon to release the movable member, and an elevating device mechanically connected to said release to accomplish an engaging position thereof, when a trough is elevated to position for such engagement.

26. In combination with rotary means for lifting and inverting a trough of dough, a fixed engaging member on the rotating means, and a movable engaging member on the said means, said two members being adapted to engage and hold a trough of dough between them, a fixed abutment to hold the movable member in engaging position, a release operating in connection with the fixed abutment at a selected point thereon to release the movable member, and an elevating device mechanically connected to said release to accomplish an engaging position thereof, when a trough is elevated to position for such engagement, said elevating device adapted to move away from engagement after said engaging position has been accomplished.

27. A dough trough adapted for use with an elevating and inverting device, comprising a long open-topped box-like structure having at its ends a web for engagement by the inverting device and a lower web for engagement by an elevating device.

28. The combination with a hinged member on a movable trough lifting device, said member being adapted to engage and hold a trough of dough, an elevating device, an abutment against which the hinged member rests to hold it in trough engaging position except at a selected point, a rocking means at said point to move the member out of engagement, and a common element for the rocking means and the lifting device adapted to operate them together in timed relation.

29. The combination with a hinged member on a movable trough lifting device, said member being adapted to engage and hold a trough of dough, an elevating device, an abutment against which the hinged member rests to hold it in trough engaging position except at a selected point, a rocking means at said point to move the member out of engagement, and a common element for the rocking means and the lifting device adapted to operate them together in timed relation and comprising a rotary member with two cam faces.

30. In combination with rotating means for lifting and inverting a trough of dough, a clamping device for engaging and holding the trough on said rotating means, and an elevating and lowering device co-operating with the clamping device to alternately lift a trough into engagement therewith, and release the clamping device and lower the trough, said rotating means being adapted to move through a portion of a circle and stop, and the clamp being held against release except at a stopped position of the rotating means.

31. In combination with means for lifting and inverting a trough of dough, an element on said means for engaging a trough and holding it, and a lifting and lowering device to place a trough into engagement and let it down from engagement with the said element, said device having a limited operation controlled mechanically to alternately lift a trough to a given position and then stop and at the next energization to lower a trough from said position and stop, said lifting means being adapted to lower a trough to position for delivery and then stop, and the engaging element on said lifting means being adapted for release only when a trough is at delivery position.

32. In combination with a trough adapted to hold a mass of conditioning dough of rotating rolls through which a mass of dough is passed, a rotating means for demountably engaging and lifting a trough of dough through a circular path about said rolls, and an operating device for said rotating means adapted to stop automatically when a trough has been lifted to a position for delivery of the dough to said rolls.

33. In combination with rotating rolls through which a mass of dough is passed, a rotating means for demountably engaging and lifting a trough of dough through a circular path about said rolls, and an operating device for said rotating means adapted to stop automatically when a trough has been lifted to a position for delivery of the dough to said rolls, a closure for a trough carried by the rotating means, and means for automatically opening the closure as the rotating member comes to a stop.

34. In combination with a trough adapted to hold a mass of conditioning dough of rotating rolls through which a mass of dough is to be passed, a pair of bull gears rotating about the axis of the roll assembly, means on the bull gears for demountably engaging a trough of dough, means for driving the bull gears adapted to stop automatically after a given movement, said roll driving means adapted to rotate them independently of the bull gear movement.

35. In combination with means for conditioning dough, a pair of bull gears rotating about the axis of the conditioning means, worms for driving the bull gears, an automatic stop motion drive for the worms, trough engaging means on the gears adapted to demountably engage said troughs, a trough closure on the gears, and cam means for controlling the position of the closure.

36. The combination, in a machine of the character described, of a pair of large rotating members, controllable trough engaging means on the members to retain and release a trough, a trough closure on the rotating members, and automatic means for controlling the closure, said closure comprising a pair of lids for a trough, lid carrying arms on the rotating members, and cam means for controlling the position of the arms.

37. The combination, in a machine of the character described, of a rotating element having interspaced members between which a trough of dough is grasped and retained, a conditioning device mounted between said members axially thereof, and a closure device for the troughs comprising a pair of lids, and means for closing said lids over a trough, and opening them by the rotating element to a position to form a tapering funnel-like mouth extending laterally of the trough and directed toward the conditioning device.

38. The combination, in a machine of the character described, of a rotating element having an automatic stop motion, said element having interspaced members between which a dough trough is grasped and retained, a conditioning device mounted axially between said members, and a closure device for the troughs, comprising a pair of lids adapted to close over the trough and to take a position forming a funnel-like mouth extending laterally of the trough, and cam means for controlling the opening and closing of the lids dependent upon the position of the rotating element.

39. In a machine of the character described, a pair of interspaced casings, conditioning rolls mounted in said casings, means for driving the rolls, and rotating trough lifting and inverting devices, journaled on the casings and having means for detachably engaging troughs of dough.

40. In a machine of the character described, a pair of interspaced casings, conditioning rolls mounted in said casings, means for driving the rolls, and rotating trough lifting and inverting devices, journaled on the casings and having means for detachably engaging troughs of dough, and having closure for troughs of dough adapted when opened to form funnel-like mouths laterally of the troughs and directed to the rolls.

41. In a machine of the character described, a pair of interspaced casings, conditioning rolls mounted in said casings, means for driving the rolls, and rotating trough lifting and inverting devices, journaled on the casings and having means for detachably engaging troughs of dough, and means for adjustably positioning said rolls.

42. In a machine of the character described, the combination of a pair of interspaced casings, conditioning rolls mounted in said casings, a driving shaft entering one of said casings, gears in said casings for driving the rolls, and swinging adjustable arms on said shaft in which the said gears and rolls are mounted, and an elevating device adapted to lift and invert troughs of dough over said rolls.

43. In a machine of the character described, the combination of a pair of casings, conditioning rolls extending between said casings, a shaft entering one of said casings, spindles for the rolls, each casing having swinging arms for journaling the spindles, and an interconnected adjusting device for the arms adapted to swing them into various positions, one of said arms being formed to carry a reversing pinion, and gearing for the spindles and the shaft, one of said arms having its gearing in a different vertical plane from the other, whereby the teeth will not interfere with a close positioning of the rolls.

44. In a machine of the character described, a pair of casings, said casings having restricted portions and journal box portions, a driving shaft for one of said casings, a gear on the shaft, conditioning rolls extending between and journaled in the boxes, said rolls having gearing to mesh with the shaft gear, and lifting and inverting devices journaled on the restricted portions of the casings and housing the boxes, said devices having means for retaining a trough of dough between the inner edges of the boxes, whereby it will not overlap the boxes.

45. In a device of the character described, the combination of rotating means interspaced to retain a trough of dough between them, and closures for a trough of dough on said rotating means, said closures comprising lids, and arms hinged on the rotating means for holding the lids, said arms having contact means extending laterally from the rotating means and a facial cam having grooves for the contact means adapted to control the opening and closing of the lids.

46. In a device of the character described, the combination of rotating means interspaced to retain a trough of dough between them, latch devices for retaining the trough of dough controllably on said rotating means, said devices comprising a swinging arm with contact means thereon, a circular track against which said contact means bears, said track having an opening at a point for delivery of a trough, and means for opening and closing said opening.

47. In a device of the character described, the combination of rotating means interspaced to retain a trough of dough between them, latch devices for retaining the trough of dough controllably on said rotating means, said devices comprising a swinging arm with contact means thereon, a circular track against which said contact means bears, said track having an opening at a point for delivery of a trough, and means for opening and closing said opening, said means comprising a movable member adapted to move with its base in the plane of the track within said opening, and a hook portion behind which the contact means will ride, and means for positively moving said means, whereby it will positively withdraw said latch arm.

48. In combination, in a machine of the character described, a movable elevating device, a trough to be elevated thereby, a pivoted arm on the roating device, a fixed radially extending web on the elevating device, a pocket-forming web on the trough, and means for operating the pivoted arm whereby when the web on the elevating device is in engagement in the said pocket an arm will swing into a position to engage the other side of the said pocket-forming web.

49. In combination, in a machine of the character described, a movable elevating device, a trough to be elevated thereby, a pivoted arm on the rotating device, a fixed radially extending web on the elevating device, a pocket-forming web on the trough, and means for operating the pivoted arm whereby when the web on the elevating device is in engagement in the said pocket an arm will swing into a position to engage the other side of the said pocket-forming web, a lifting device to bring a trough to such position, and an additional web on the trough to engage said lifting device, said means for operating the pivoted arm adapted also to operate the lifting device.

FRANK X. LAUTERBUR.